United States Patent
Kalis, Jr. et al.

[11] Patent Number: 5,267,773
[45] Date of Patent: Dec. 7, 1993

[54] UTILITY TRUCK BODY WITH OPTION ATTACHMENT COMPONENTS

[75] Inventors: George Kalis, Jr.; Robert M. Lapsley, both of Wooster, Ohio

[73] Assignee: Stahl/Scott Fetzer Company, Wooster, Ohio

[21] Appl. No.: 889,948

[22] Filed: Jun. 2, 1992

[51] Int. Cl.⁵ ............................................. B60R 9/00
[52] U.S. Cl. .................................. 296/183; 296/37.6
[58] Field of Search ................. 296/183, 37.6, 167, 296/100

[56] References Cited

U.S. PATENT DOCUMENTS

| | | |
|---|---|---|
| 2,722,352 | 1/1955 | Dehnel ............................ 296/37.6 X |
| 3,722,910 | 3/1973 | Heckenlaible . |
| 4,135,761 | 1/1979 | Ward ................................ 296/37.6 |
| 4,239,139 | 12/1980 | Bott . |
| 4,248,558 | 2/1981 | Lechner . |
| 4,469,261 | 9/1984 | Stapleton et al. . |
| 4,500,020 | 2/1985 | Rasor . |
| 4,705,317 | 11/1987 | Henri . |
| 4,815,787 | 3/1989 | Hale .................................. 296/167 |
| 4,911,348 | 3/1990 | Rasor et al. . |
| 4,969,784 | 11/1990 | Yanke . |
| 5,037,153 | 8/1991 | Stark ................................ 296/37.6 |
| 5,052,739 | 10/1991 | Irwin ................................ 296/37.6 |
| 5,088,636 | 2/1992 | Barajas ........................ 296/37.6 X |

OTHER PUBLICATIONS

Hi-Lift Jack Co. brochure.

Primary Examiner—Joseph D. Pape
Attorney, Agent, or Firm—Watts, Hoffmann, Fisher & Heinke Co.

[57] ABSTRACT

A truck body is disclosed for mounting on a standard truck frame. The body includes extruded attachment components which run the full length of the body. The attachment components have T-slots formed beneath their surfaces for permitting attachment of optional equipment to the truck body. The attachment components are designed to conform to the shape of the truck body in an aesthetically pleasing manner.

15 Claims, 3 Drawing Sheets

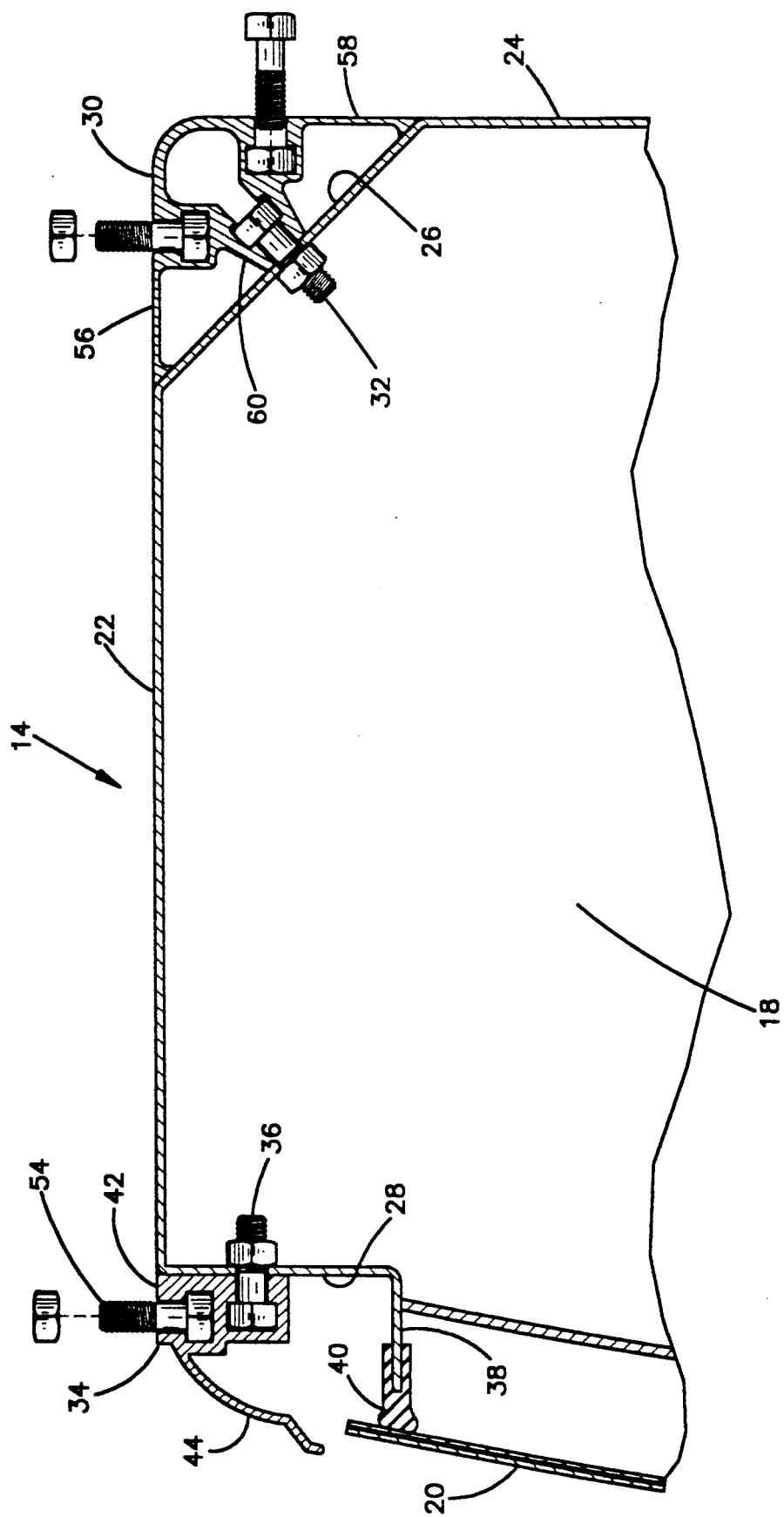

UTILITY TRUCK BODY WITH OPTION ATTACHMENT COMPONENTS

BACKGROUND OF THE INVENTION

1. Field of the Invention

The present invention relates to truck bodies, and more particularly, to truck bodies having slotted body components for attaching optional equipment and accessories to truck beds.

2. Description of Related Art

Utility truck bodies are often modified by tradesmen to fit their particular needs. For example, superstructures for enclosing the truck bed, tool racks, cargo securing devices, and other accessories are often bolted to the truck body. Typically, installation of such accessories required that numerous holes be drilled into the truck body. When it was desired to replace the accessories or add new ones, more drilling was necessary. The drilling of holes in the truck body resulted in water leakage into tool storage compartments and rust formation in addition to an unattractive appearance.

It is known to fasten a slotted rail to a truck body for providing a cargo-securing device. Typically, such rails are bolted to the truck body as an add-on accessory and do not conform to the shape of the truck body. That is, the bolt-on rails project from the truck bed. In addition to creating an unattractive appearance, the rails sometimes interfere with cargo and reduce the usuable dimensions of the bed. Furthermore, existing slotted rails have only one slot, thus limiting the flexibility of the rails.

SUMMARY OF THE INVENTION

An object of the present invention is to provide a truck body with attachment components for conveniently attaching optional equipment without the need for drilling holes in the truck body.

Another object of the invention is to provide a truck body with T-slots which lie beneath the surface of the body.

Another object of the invention is to provide a truck body with an attachment component having a plurality of T-slots formed therein.

A further object of the invention is to provide attachment components for a truck body which are designed to conform to the shape of the truck body in an aethetically pleasing manner.

In a preferred embodiment, the invention includes a truck body having side surfaces, upstanding side structures, a bed between the side structures, and an attachment component extending along the side structures longitudinally of the bed. The attachment component is improved in that it comprises an elongated extrusion having a top surface that forms a continuation of a top surface of one of the side structures, a side surface forming a continuation of a side surface of the one side structure, and a connecting surface confronting a portion of the one side structure between its top and side surfaces, and T-slots in the extrusion extending along its connecting surface and at least one of the top and side surfaces.

In another preferred embodiment, the truck body includes a door and the attachment component includes a side surface forming an overhang located above the door.

Other objects and advantages and a fuller understanding of the invention will be had from the following detailed description of the preferred embodiments and the accompanying drawings

BRIEF DESCRIPTION OF THE DRAWINGS

Preferred embodiments of the invention are shown in the accompanying drawings in which:

FIG. 2 is a partial cross sectional view as seen approximately from the plane indicated by the line 2—2 of FIG. 1;

DESCRIPTION OF THE PREFERRED EMBODIMENTS

Figure 1:
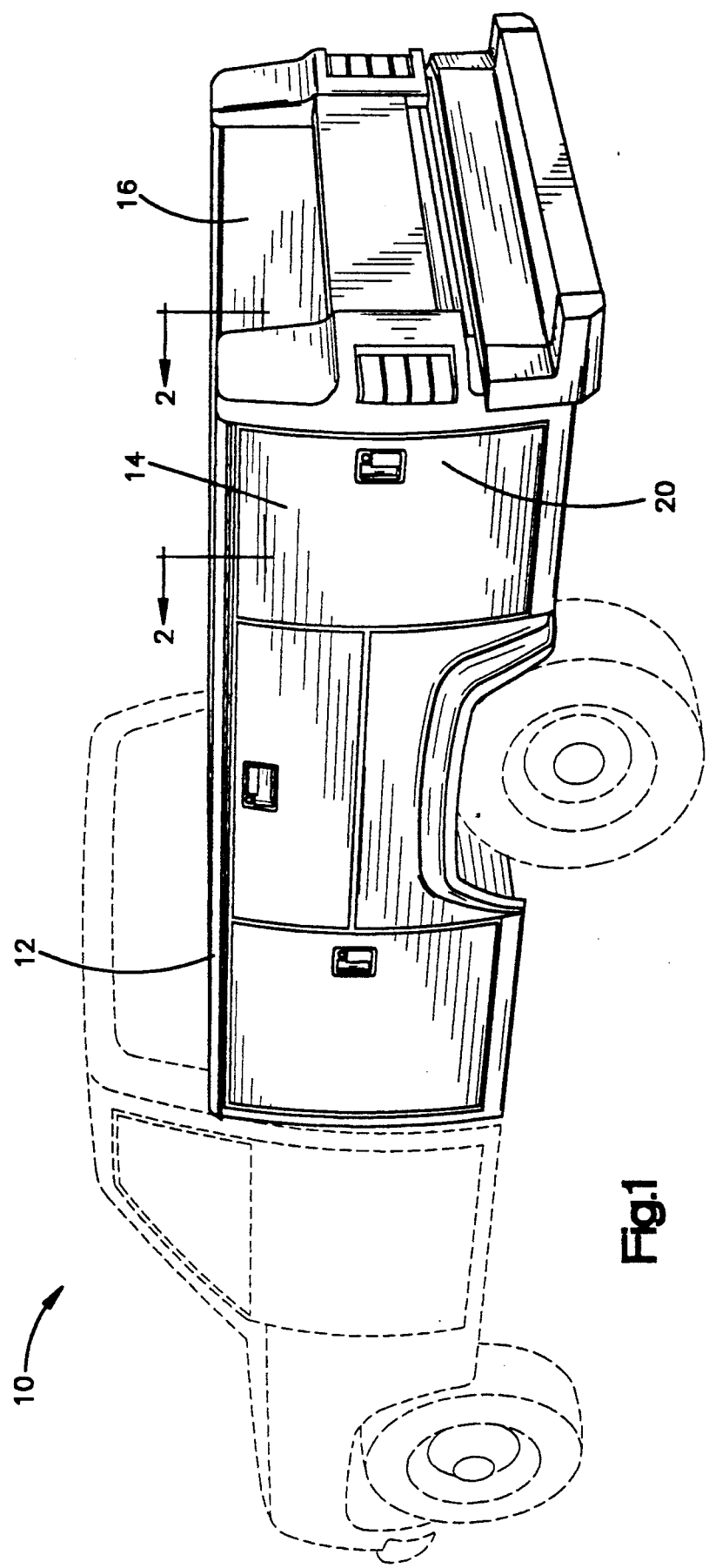
FIG. 1 is a perspective view of a utility truck body having attachment components embodying the present invention.

Referring to FIG. 1, a truck 10 having a utility body 12 is illustrated. The body 12 includes a pair of upstanding side structures 14, 16, a bed, and a plurality of storage compartments 18. A plurality of doors 20 cover the storage compartments 18. The two side structures are mirror images of one another. The body 12 is constructed to be fastened to the frame of a commercially available truck.

Referring to FIG. 2, each side structure 14, 16 includes a top surface 22, an inner vertical surface 24, an inner connecting face 26, and an outer connecting face 28. An inner attachment component 30 is connected to the inner connecting face 26 by a fastener 32. An outer attachment component 34 is connected to the outer connecting face 28 with a fastener 36. The attachment components 30, 34 which run along substantially the full length of the truck body 12, conform to the shape of the truck body 12 and form part of its aesthetically pleasing shape.

A flange 38 is formed about each storage compartment defining an access opening. A resilient seal 40 is provided between each flange 38 and each door 20. The doors 20 are hinged for swinging toward and away from the seals 40 to permit access to the storage compartments 18 from the outside of the truck 10.

Figure 3:
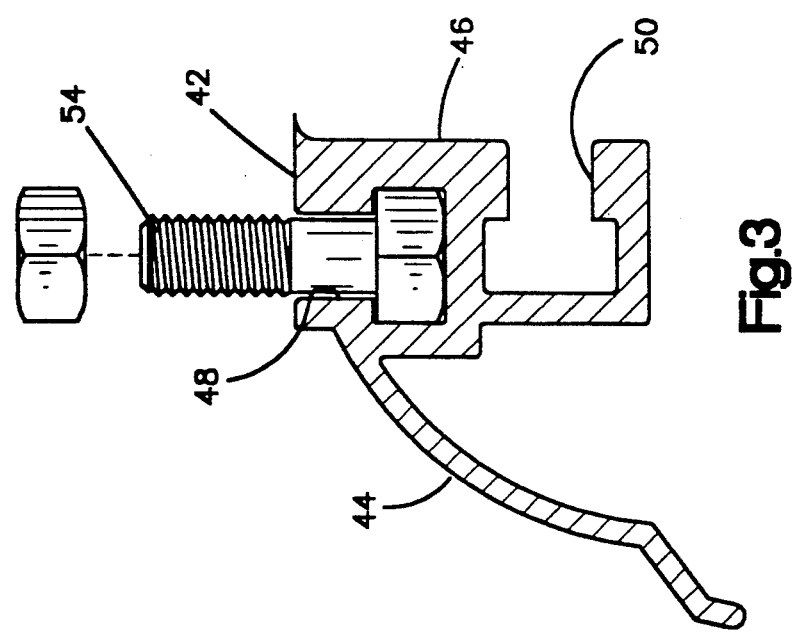
FIG. 3 is a cross sectional view of one attachment component of the truck body of FIG. 1.

Referring to FIGS. 2 and 3, the outer attachment component 34 is an extruded part including a top surface 42, a sloped side member 44, and a connecting surface 46. The component 34 also includes two parallel T-slots 48, 50. One of the T-slots 50 is formed in the connecting surface 46 and serves to retain the fastener 36 for connecting the component 30 to the connecting face 28. The other T-slot 48 is formed in the top surface 42 and serves to receive one or more fasteners 54 for mounting optional equipment to the truck body 12. The sloping side member 44 serves as a rain deflector for deflecting rain away from the storage compartment seal 38. The side member 44 also forms an aesthetically pleasing curve for complementing the curvature of the doors 20.

Figure 4:
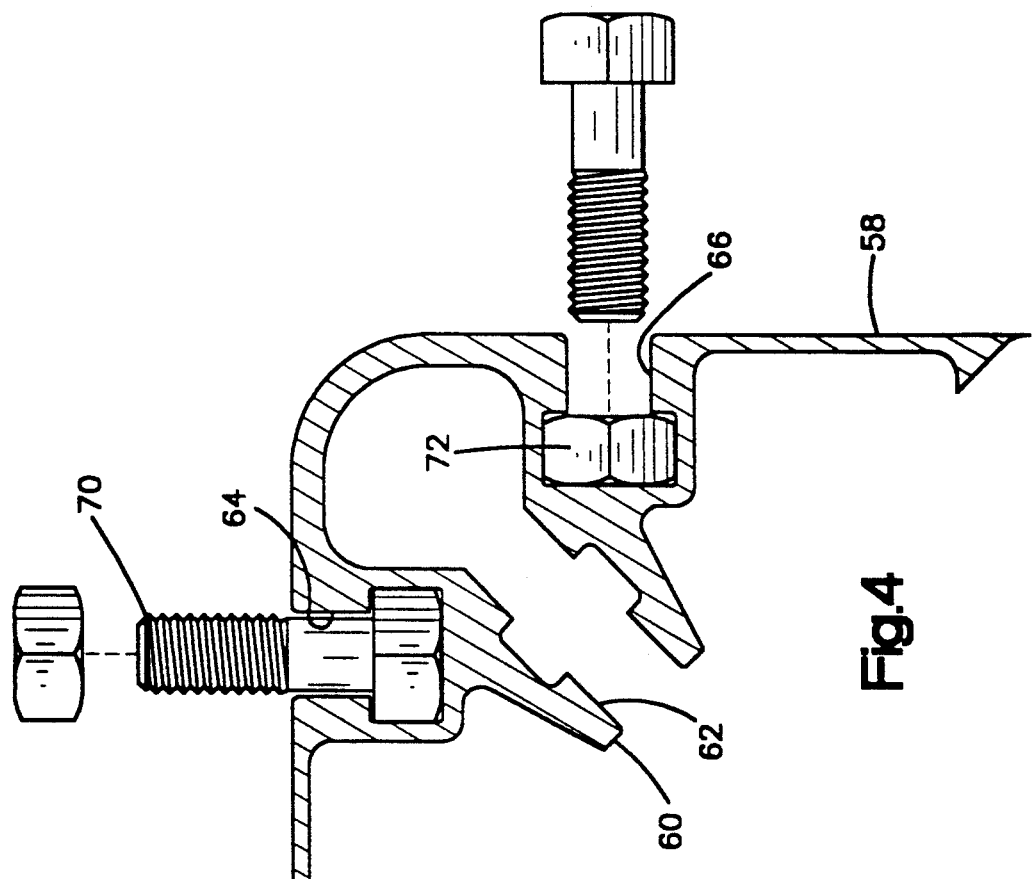
FIG. 4 is a cross sectional view of a second attachment component embodiment included in the truck body of FIG. 1.

Referring to FIGS. 2 and 4, the inner attachment component 30 is an extruded part including a top surface 56, a side surface 58, and a connecting portion 60. The component 30 includes three parallel T-slots 62, 64, 66. One of the T-slots 62 is formed in the connecting portion 60 and serves to retain fasteners 32 for connecting the component 30 to the connecting face 26. The other two T-slots 64, 66 are used for receiving fasteners 70,72 for mounting optional equipment to the truck body 12. One of the T-slots 64 faces a direction which is 90° from the direction faced by the other T-slot 66. Thus, one slot 64 faces upward and the other slot 66 faces inward toward the opposite side structure.

The T-slots 48,64,66 are constructed to slidably receive fasteners such as bolt heads, nuts, or a simple plates having threaded openings formed therein (not shown). The fasteners fit loosely within the slots 48,64,66 to permit rapid positioning of the fasteners to any location along the length of the truck body 12. The forward ends of the components 30,34 (near the truck cab) are unobstructed to permit fasteners to be inserted and removed from the T-slots. The T-slots 48,64,66 are below the surface of the truck body 12 and thus do not interfere with cargo and do not reduce the usable dimensions of the bed. Thus, for example, if a superstructure (not shown) is to be fastened to the truck body 12, it is not necessary to measure and drill holes in the body 12. A number of bolt heads are simply inserted into the T-slots 48,64 with their threaded portions projecting upwardly. The superstructure is lowered onto the body 12 while the bolts are aligned with openings in the superstructure. Finally, nuts are tightened on the bolts for securing the superstructure to the body 12.

While preferred embodiments of this invention have been described in detail, it will be apparent that certain modifications or alterations can be made without departing from the spirit and scope of the invention set forth in the appended claims.

We claim:

1. In a truck body having side surfaces, upstanding side structures, a bed between the side structures, and attachment means extending along said side structures longitudinally of said bed, the improvement wherein said attachment means comprises an elongated extrusion having a top surface that forms a continuation of a top surface of one of said side structures, a side surface forming a continuation of a side surface of said one of said side structures, and a connecting surface confronting a portion of said one side structure between said top and side surfaces of said side structure, and T-slots in said extrusion extending along its connecting surface and at least one of its top and side surfaces.

2. A truck body according to claim 1 wherein said T-slots extend along said top surface, side surface and connecting surface.

3. A truck body according to claim 2 wherein said T-slot in said side surface faces a direction which is at a right angle to the direction faced by said T-slot in said top surface.

4. A truck body according to claim 2 wherein said T-slot in said connecting surface is constructed to face a direction which is 135 degrees from the direction faced by said T-slot in either of said top or side surface.

5. In a truck body having upstanding side structures, a door formed in a side of one of said side structures, a bed between the side structures, and attachment means extending along said side structures longitudinally of said bed, the improvement wherein said attachment means comprises an elongated extrusion having a top surface that forms a continuation of a top surface of one of said side structures, a side surface forming an overhang above said door for deflecting rain water, and a connecting surface confronting a portion of said one of said side structures and T-slots in said extrusion extending along said connecting surface and top surface.

6. The truck body according to claim 4 wherein said T-slot in said connecting surface faces a direction which is at a right angle to the direction faced by said T-slot in said top surface.

7. An extrusion adapted to connect to a truck body, said extrusion comprising:
   an outer surface adapted to conform to an outer surface of said truck body;
   an inner surface adapted to confront said truck body;
   a first T-slot formed in said outer surface for receiving fastener means for attaching optional components to said truck body;
   a second T-slot parallel to said first T-slot formed in said inner surface for receiving fastener means for attaching said extrusion to said truck body.

8. An extrusion according to claim 7 wherein said outer surface includes a top surface portion which is adapted to be continuous with a surface of said truck body when the extrusion is attached to said truck body.

9. An extrusion according to claim 7 wherein said outer surface has a third T-slot parallel to said first T-slot.

10. An extrusion according to claim 7 wherein said outer surface includes an overhang for deflecting rain water.

11. In a truck body having side surfaces, upstanding side structures, a bed between the side structures, and attachment means extending along said side structures longitudinally of said bed, the improvement wherein said attachment means comprises an elongated extrusion having a top surface that forms a continuation of a top surface of one of said side structures such that said top surface of said extrusion is coplanar with said top surface of said one side structure, and a connecting surface confronting a portion of said one side structure between said top and side surfaces of said one side structure, and a T-slot in said extrusion extending beneath said top surface of said extrusion.

12. A truck body according to claim 11 wherein a T-slot extends along said connecting surface.

13. A truck body according to claim 11 wherein a T-slot extends along said side surface and faces a direction which is at a right angle to the direction faced by said T-slot in said top surface.

14. A truck body according to claim 12 wherein said T-slot in said connecting surface is constructed to face a direction which is 135 degrees from the direction faced by said T-slot in said top surface.

15. A truck body according to claim 11 wherein said extrusion includes an overhang for deflecting rain water.

* * * * *